April 5, 1955   S. McCORMICK   2,705,444
HYDRAULIC HITCH CONTROL FOR TRACTORS
Filed Feb. 17, 1951                             2 Sheets-Sheet 1

STANLEY McCORMICK
INVENTOR

BY Charles Shepard
ATTORNEY

April 5, 1955 S. McCORMICK 2,705,444
HYDRAULIC HITCH CONTROL FOR TRACTORS
Filed Feb. 17, 1951 2 Sheets-Sheet 2

STANLEY McCORMICK
INVENTOR

BY Charles Shepard
ATTORNEY

United States Patent Office 2,705,444
Patented Apr. 5, 1955

2,705,444

HYDRAULIC HITCH CONTROL FOR TRACTORS

Stanley McCormick, Bergen, N. Y.

Application February 17, 1951, Serial No. 211,499

5 Claims. (Cl. 97—46.01)

The present invention relates to work vehicles and more particularly to field tractors of the type that includes a hydraulic boom and lift mechanism on the rear end thereof for the purpose of hitching on various interchangeable farm work units dragged by the tractor and for regulating their elevation according to the particular function of each. The boom is also further used, for instance, to chain hitch onto logs and similar heavy objects in dragging them on the ground from place to place in a semi-supported condition of attachment.

With tractors of this kind now in general use and in all such instances of use, the act of hitching, usually performed by the driver himself, is accomplished while standing on the ground in rear of the vehicle adjacent to the boom and often in a crowded space between the object being attached and the vehicle wherein continued operation of the raising and lowering mechanism, in an emergency, often subjects the operator to the danger of injury from slippage or swinging of the heavy objects he is manipulating yet the control lever of the hydraulic mechanism by which the boom is neutralized or reversed is then beyond his reach being customarily placed forwardly adjacently to the driver's seat where the driver can thereby take his ground tools in and out of work while the vehicle is traveling.

It is, therefore, a general object of this invention to provide simple, efficient and reliable means whereby a person in the said hitching position in rear of the vehicle may operate the main control lever, still located forwardly, as quickly and conveniently as though he were sitting in the driver's seat.

A further object of the invention is to provide this dual control mechanism as a unit assembly that may be readily installed on tractors now in use as well as being furnished as original standard equipment.

These and other desirable objects may be attained in the manner disclosed as an illustrative embodiment of the invention in the following description and in the accompanying drawings forming a part hereof, in which:

Fig. 1 is a vertical fragmentary section through the rear axle of a farm field tractor taken in a plane adjacent to the left rear driving wheel thereof and looking toward the right rear driving wheel showing the differential and transmission casings, the housing of the hydraulic lifting gear mechanism, the boom operated thereby and the hydraulic control mechanism in inside elevation, the latter constructed in accordance with and illustrating one embodiment of the present invention, the forepart of the vehicle being broken away;

The same reference numerals throughout the several views indicate the same parts.

Figure 1:
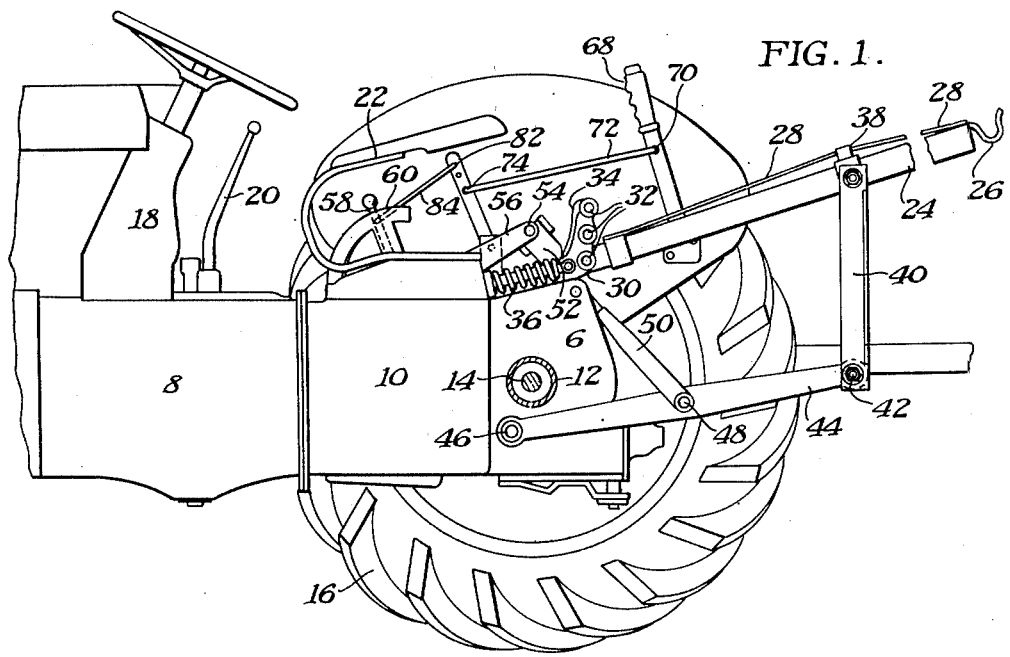
Figure 2:
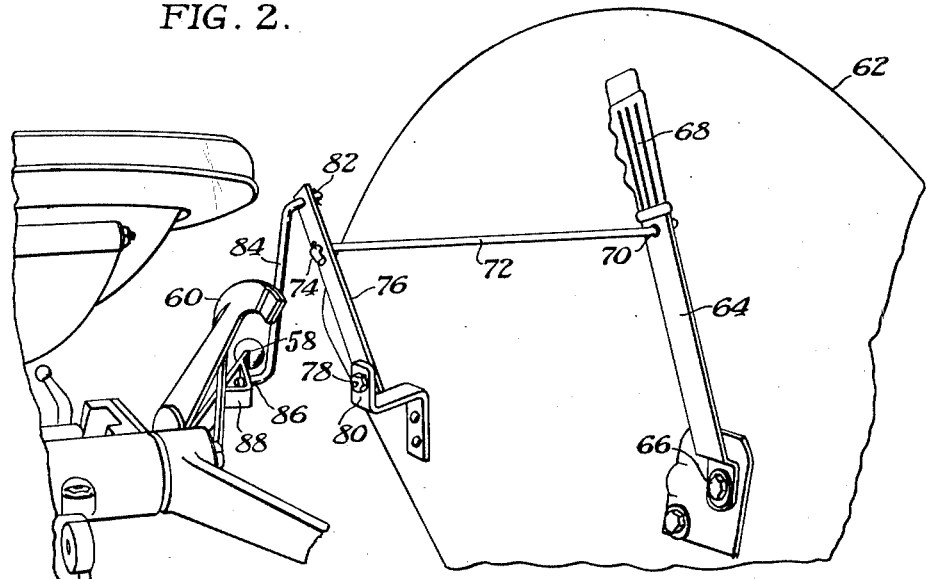
Fig. 2 is an enlarged perspective fragmentary view of the hydraulic control assembly taken angularly from the inside rear.

Referring more particularly to the drawings, the tractor partially illustrated is, as to its main construction, of a familiar type now in general use and as far as an understanding of the present invention is concerned comprises a main frame constituted centrally by a differential casing 6, a transmission gear casing 8 and an intermediate hydraulic lifting gear housing 10, all connected in forward alignment. The transverse rear axle housing 12 enclosing the axle 14 supporting the driving ground wheels 16 joins as usual with the differential casing 6. Mounted on forward casing 8 are steering column 18 and gear shift lever 20 while in rear thereof on housing 10 is the driver's seat 22.

The lifting and hitching boom proper projecting from the rear of the vehicle is indicated at 24, and terminates in a snatch hook 26. It embodies, in the present showing, a tubular bar reinforced by a truss rod 28 extending its length. Its inner end is provided with a bearing eye 30 engaged with one of three selective pivots 32 on a short arm 34 rising from casing 6 and having a limited forward movement against the tension of a compression spring 36 for an object with which we are not here concerned but which has to do with automatically shutting off the driving power should the vehicle rear up on axle 14 and cause upward pressure on the boom or other lifting gear. Arm 34 is important here only as a radius anchorage for the boom. The latter is also pivoted at an intermediate point 38 to the top of a triangular transverse frame 40 the lateral ends of the base of which carry trunnions 42. Pivoted on these trunnions, respectively, are the outer rearward ends of a pair of levers 44 pivoted on either side of casing 6 at 46.

Figure 3:
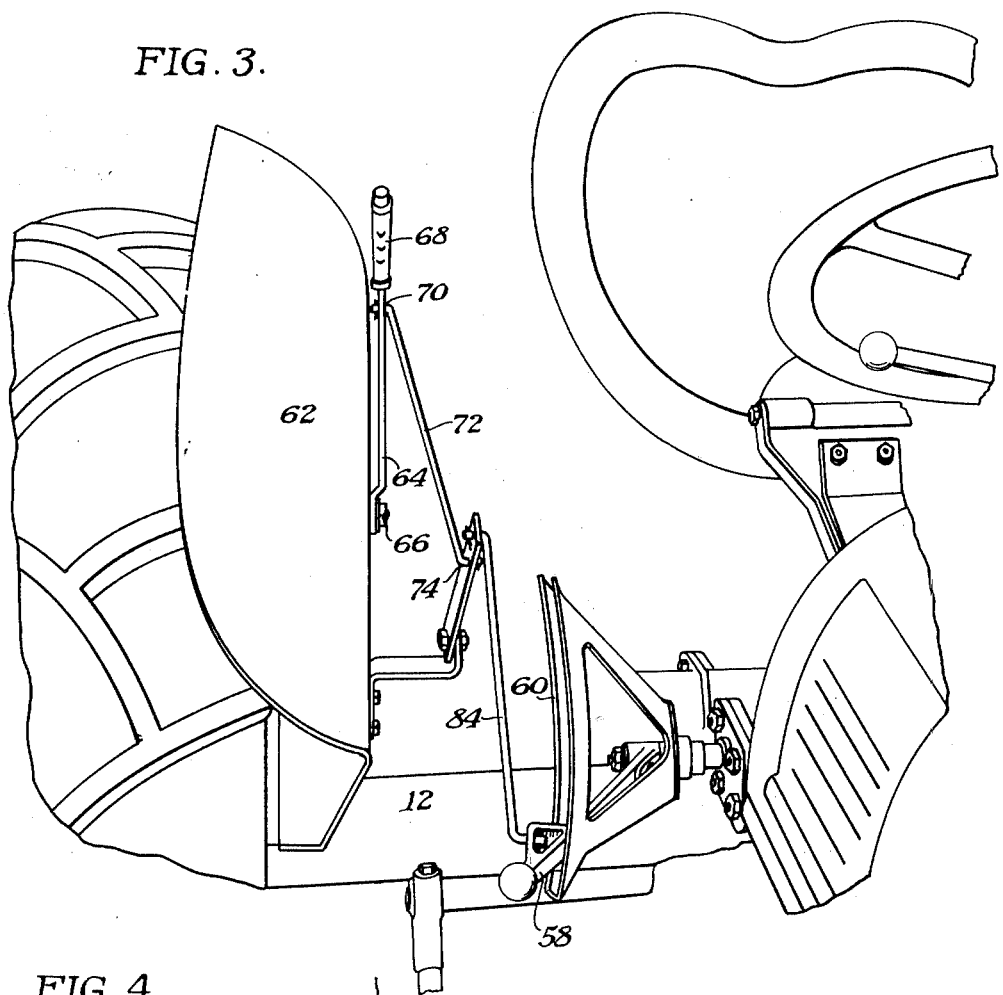
Fig. 3 is a fragmentary front view of the latter.
Figure 4:
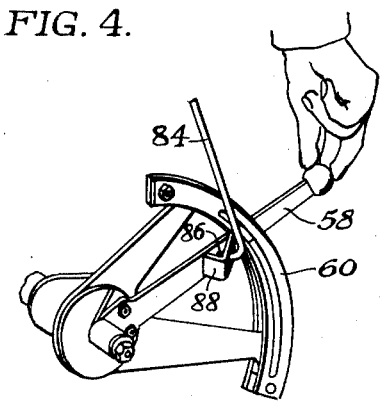
Fig. 4 is a detail perspective view of the main control lever in the region of the driver's seat and accessible therefrom.
Figure 5:
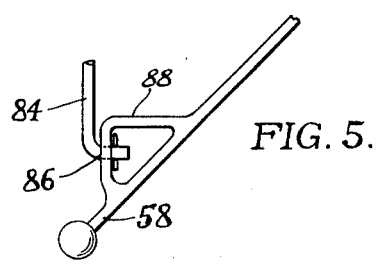
Fig. 5 is a further enlarged detail in top plan view of the outer end portion of the main control lever.

Extending upwardly out of hydraulic gear casing 10 is a short power arm 56 which is actuated up or down by the hydraulic mechanism contained in the latter and pivoted thereto at 54 through a head 52 is a link 50 pivoted at 48 to lever 44. Suitable valve arrangements in casing 10 place the raising and lowering movements of arm 56 and hence links 50, levers 44, frame 40 and boom 24 under the control of a main control lever 58 working in a segmental guide 60 fixed to the main frame of the vehicle and projecting to the right of the driver's seat 22 from which it is accessible. When this main control lever 58 is raised to the position of Fig. 1 the boom 24 is raised to its upward lifting limit. When lever 58 is down to the position of Fig. 3 the boom is down to its lower limit. Intermediate positions correspond.

But it will be seen that the seat 22 and the main control lever 58 being well forward of axle 14 and of boom hitch 26, the driver, if working alone, must leave his seat and move to the rear of the machine in making a hitch to boom 24 where he is out of reach of control lever 58. Therefore, in the practice of the present invention, there is provided an auxiliary control lever 64 handily located rearwardly of the axle, to an operator, the driver or another, thus standing on the ground in rear of the vehicle, and rather crowded between the latter and whatever dead weight he is contriving to hitch to boom 24 and the gyrations of which might crowd him dangerously as it continues to rise or fall. The lower end of this substantially upright lever is suitably pivoted at 66 at a low point on the right mudguard or fender 62 forming part of and rigid with the main frame as previously described. The upper end terminates in a hand grip 68 the extremity of which is preferably below the level of the top of fender 62 so that the latter may function additionally as a guard preventing the branches of trees, for instance, under which the vehicle is passing from engaging and falsely operating the controls. At an intermediate point 70 such lever 64 is connected at 74 to a more forward intermediate lever 76 pivoted at 78 to an inwardly offset bracket 80 also fixed to the mudguard and fender 62. Finally, through a pivotal connection 82 on intermediate lever 76, a link 84 pivotally connects this lever directly with main control lever 58 at 86, the main control lever being provided for this purpose with a bracket extension 88 to preserve alinement in the general plane of leverage.

With the positioning arrangements thus clearly shown and described it will be obvious that a rearward pull on auxiliary lever 64—68 will impart upward movement to main control lever 58 and upward movement of boom 24 while a forward push on the auxiliary lever will have the reverse action.

It will be equally obvious that the link and lever assembly can be readily attached at the points 66 and 80 with the frame of any tractor now in use having the characteristics shown and described.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A field tractor embodying a frame including transmission and axle housings, a rear axle within the latter, rear drive wheels on the axle, a lifting boom extending rearwardly from and supported on the frame, and means for lifting and lowering the boom including a main control lever located on the housing forwardly of the axle, a driving seat on the frame adjacent to said control lever from which the lever is accessible, an auxiliary control lever pivoted on the frame in rear of the axle and accessible from the region of the boom, an intermediate lever similarly pivoted, a link connecting the auxiliary control lever with the intermediate lever and a link connecting the latter with the main control lever.

2. A field tractor in accordance with claim 1, in which the frame includes mudguard fenders for the wheels rising from and rigid with the axle housing and the auxiliary and intermediate levers are pivotally mounted on the inner side of one of such fenders.

3. An auxiliary control unit for attachment to field tractors having hydraulic lifting booms extending rearwardly therefrom, a main control lever for the latter relatively forwardly arranged on the tractor and lateral mudguard fenders, said unit comprising an upright auxiliary hand control lever and pivot bracket therefor adapted to be attached to the inside of one of the fenders at a point accessible from the region of the boom, an intermediate substantially parallel lever and pivot bracket adapted to be also attached to the same fender in a more forward position thereon, a link pivotally connecting the auxiliary control lever and the intermediate lever, and a second link pivoted to the intermediate lever and carrying a pivotal connection adapted to be attached to the main hydraulic control lever.

4. An attachment for a tractor of the type having a rear axle extending transversely, wheels at opposite ends of said axle, a mudguard over one of said wheels, a driver's seat above and forwardly of said axle, a hydraulic lift boom pivotally connected to the tractor structure in the vicinity of said axle and extending rearwardly therefrom and mounted to swing upwardly and downwardly, and a control lever for controlling upward and downward movements of said boom, said control lever being mounted in front of said axle and beside said seat in position to swing downwardly and forwardly in one direction and upwardly and rearwardly in the opposite direction, said attachment comprising an operating lever pivotally mounted on said mudguard near the rear edge thereof and substantially below the top of the mudguard in a position manually accessible to the driver when he has left said driver's seat and is standing in rear of said tractor beside said boom, an intermediate lever pivotally connected to said mudguard approximately above said axle and rearwardly of said operating lever, both said operating lever and said intermediate lever being mounted for swinging movement in a forward and backward direction in approximately vertical planes, a first link connecting said control lever to said intermediate lever to move one from movement of the other, and a second link connecting said intermediate lever to said operating lever to move one from movement of the other.

5. A construction as defined in claim 4, in which said second link and said first link are connected to said intermediate lever at different points at different distances from the pivot of said intermediate lever.

References Cited in the file of this patent

UNITED STATES PATENTS

| | | |
|---|---|---|
| 1,359,564 | Bates | Nov. 23, 1920 |
| 1,407,606 | Virgens | Feb. 21, 1922 |
| 1,434,389 | Keltner | Nov. 7, 1922 |
| 1,455,614 | Heuer et al. | May 15, 1923 |
| 1,701,118 | Peterson | Feb. 5, 1929 |
| 2,362,578 | Mott | Nov. 14, 1944 |
| 2,554,900 | Davies | May 29, 1951 |
| 2,567,107 | Gobeil | Sept. 4, 1951 |
| 2,572,404 | Stoltenberg | Oct. 23, 1951 |
| 2,586,390 | Schumaier | Feb. 19, 1952 |
| 2,591,662 | Struthers et al. | Apr. 1, 1952 |